United States Patent
Yoo et al.

(10) Patent No.: US 9,886,014 B2
(45) Date of Patent: Feb. 6, 2018

(54) SYSTEM AND METHOD FOR DECENTRALIZED ENERGY RESOURCE BASED ACTIVE VIRTUAL POWER ENERGY MANAGEMENT

(71) Applicant: Electronics and Telecommunications Research Institute, Daejeon (KR)

(72) Inventors: Yoon-Sik Yoo, Daejeon (KR); Il-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 459 days.

(21) Appl. No.: 14/609,036

(22) Filed: Jan. 29, 2015

(65) Prior Publication Data

US 2015/0220099 A1   Aug. 6, 2015

(30) Foreign Application Priority Data

Feb. 6, 2014   (KR) .................. 10-2014-0013704

(51) Int. Cl.
| | |
|---|---|
| G05D 5/00 | (2006.01) |
| G05D 9/00 | (2006.01) |
| G05D 11/00 | (2006.01) |
| G05D 17/00 | (2006.01) |
| G05B 15/02 | (2006.01) |
| H02J 3/46 | (2006.01) |
| H02J 13/00 | (2006.01) |

(52) U.S. Cl.
CPC .............. G05B 15/02 (2013.01); H02J 3/46 (2013.01); H02J 13/0079 (2013.01)

(58) Field of Classification Search
CPC .......... G05B 15/02; H02J 13/0079; H02J 3/46
USPC ................................. 700/287–297
See application file for complete search history.

(56) References Cited

U.S. PATENT DOCUMENTS

| | | | |
|---|---|---|---|
| 2004/0027004 A1* | 2/2004 | Bayoumi | .................. H02J 3/38 307/43 |
| 2011/0047418 A1* | 2/2011 | Drees | ..................... G05B 15/02 714/57 |

(Continued)

FOREIGN PATENT DOCUMENTS

| | | |
|---|---|---|
| CN | 102402725 A | 4/2012 |
| JP | 2011-259667 A | 12/2011 |

(Continued)

*Primary Examiner* — Ziaul Karim
(74) *Attorney, Agent, or Firm* — William Park & Associates Ltd.

(57) ABSTRACT

The present invention relates to a system and method for decentralized energy resource based active virtual power energy management. According to an embodiment of the present invention, there is provided a system for decentralized energy resource based active virtual power energy management comprising: a meter data management device receiving a customer load profile from a customer; a resource aggregator obtaining energy generation resource state information and position information of a decentralized energy resource from at least one decentralized energy resource; and a virtual energy generation resource management device generating a decentralized energy resource load profile using the energy generation resource state information and providing energy required to the customer based on the customer load profile, the decentralized energy resource load profile and the position information.

13 Claims, 6 Drawing Sheets

(56) References Cited

U.S. PATENT DOCUMENTS

2012/0083930 A1* 4/2012 Ilic .................. G06Q 30/06
                                                    700/287
2012/0271476 A1    10/2012 Parsonnet et al.
2013/0304275 A1    11/2013 Lee et al.
2013/0345884 A1* 12/2013 Forbes, Jr. ............ G05B 15/02
                                                    700/286

FOREIGN PATENT DOCUMENTS

| KR | 1020060110854 A | 10/2006 |
| KR | 2013-0068042 A  | 6/2013  |
| KR | 2013-0074045 A  | 7/2013  |
| KR | 1020130094014 A | 8/2013  |
| KR | 1020130111014 A | 10/2013 |
| KR | 1020130126139 A | 11/2013 |

* cited by examiner

[FIG. 6]
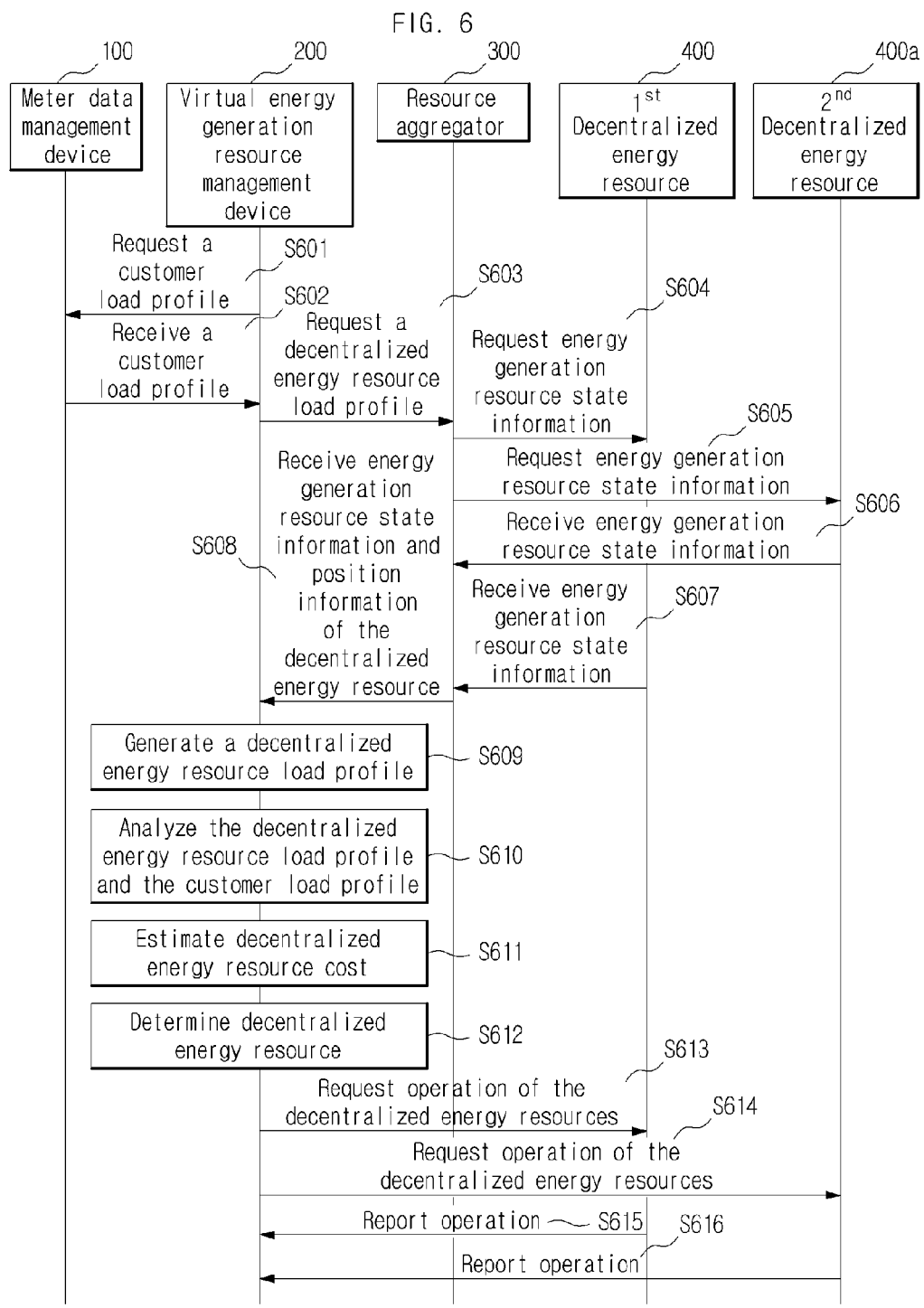

SYSTEM AND METHOD FOR DECENTRALIZED ENERGY RESOURCE BASED ACTIVE VIRTUAL POWER ENERGY MANAGEMENT

CROSS REFERENCE TO RELATED APPLICATION

This application claims the benefit of Korean Patent Application No. 10-2014-0013704, filed on Feb. 6, 2014, entitled "System and Method for Decentralized Energy Resource based Active Virtual Power Energy Management", which is hereby incorporated by reference in its entirety into this application.

BACKGROUND

1. Technical Field

The present invention relates to a virtual power energy management method and system to supply stabilized energy by clustering decentralized energy resource virtually in decentralized energy resource environment.

2. Description of the Related Art

Conventional decentralized energy resources supply energy by installing generation resources inside the building or locally in some areas to generate energy when energy is not supplied from an electric power system. The decentralized energy resource usually supplies energy territorially and independently.

However, a conventional decentralized energy resource management technology can supply energy of decentralized generation resources only inside the building to which the energy of decentralized resources can be supplied or its adjacent areas.

Particularly, since different kinds of decentralized energy resources and countless decentralized energy resources which are distributed over a wide area are not managed integrally, use of such decentralized energy resources are very insignificant in case of emergency.

SUMMARY

An object of the present invention is to provide a system and method for decentralized energy resource based active virtual power energy management which is able to supply power energy actively by monitoring available energy resources in real-time based on decentralized energy resources, managing hierarchically, securing energy resources suitable for energy demand patterns according to load profiles of customers in case of emergency, and clustering virtual energy.

According to an embodiment of the present invention, there is provided a system for decentralized energy resource based active virtual power energy management comprising: a meter data management device receiving a customer load profile from a customer; a resource aggregator obtaining energy generation resource state information and position information of a decentralized energy resource from at least one decentralized energy resource; and a virtual energy generation resource management device generating a decentralized energy resource load profile using the energy generation resource state information and providing energy required to the customer based on the customer load profile, the decentralized energy resource load profile, and the position information.

According to another embodiment of the present invention, there is provided a device for decentralized energy resource based active virtual power energy management comprising: a customer load profile acquisition unit obtaining a customer load profile from a customer; a decentralized energy resource load profile acquisition unit obtaining a decentralized energy resource load profile from the decentralized energy resources which provide energy to the customer; a position information acquisition unit obtaining position information of the decentralized energy resource; a decentralized energy resource determination unit analyzing an energy using pattern of the customer using the customer load profile, collecting a candidate group of the decentralized energy resources which generate energy corresponding to the energy using pattern of the customer, and selecting a decentralized energy resource from the candidate group of the decentralized energy resources using the position information; and a decentralized energy resource operation requesting unit requesting energy production to the selected decentralized energy resource.

In an embodiment, the device may further comprise a decentralized energy resource cost estimating unit estimating cost by comparing costs of energy productions which the decentralized energy resources generate when the decentralized energy resource determination unit selects the decentralized energy resource. Here, the decentralized energy resource determination unit, when the production cost is a predetermined value or higher, may exclude a decentralized energy resource of which the production cost is a predetermined value or higher.

In another embodiment, the decentralized energy resource determination unit may comprise: a production energy pattern acquisition unit obtaining an energy pattern which is generated from the decentralized energy resource; a customer threshold energy acquisition unit obtaining energy threshold consumed by the customer; a decentralized energy resource selection unit selecting a decentralized energy resource having the value which is the energy threshold or higher consumed by the customer from the decentralized energy resources; and a clustering unit arranging energy outputs being outputted from the selected decentralized energy resource in energy arrangement space and then controlling the energy outputs not to result in energy output having energy less than the energy threshold consumed by the customer.

In still another embodiment, the clustering unit, when the energy output having energy less than the energy threshold consumed by the customer is resulted in, may control the energy outputs not to result in energy output having energy less than the energy threshold consumed by the customer by time shifting at least one energy output selected from the energy outputs.

In still another embodiment, the decentralized energy resource load profile acquisition unit may obtain a decentralized energy resource load profile periodically from the decentralized energy resource which supplies energy to the customer In still another embodiment, the customer load profile may comprise energy consumption information from the customer, wherein the decentralized energy resource load profile may comprise energy information which is generated from the decentralized energy resource.

According to still another embodiment of the present invention, there is provided a method for decentralized energy resource based active virtual power energy management comprising: obtaining a customer load profile from a customer; obtaining a decentralized energy resource load profile from a decentralized energy resource which provides energy to the customer; obtaining position information of the decentralized energy resource; analyzing an energy using pattern of the customer and collecting a candidate group of the decentralized energy resources which generate energy corresponding to the energy using pattern of the customer; selecting the decentralized energy resource from the candidate group of the decentralized energy resources using the position information; and requesting energy production to the selected decentralized energy resource.

In an embodiment, the method may further comprise estimating cost by comparing costs of energy productions which the decentralized energy resources generate, wherein when the decentralized energy resource is selected, a decentralized energy resource of which the production cost is a predetermined value or higher is excluded.

In another embodiment, the step of selecting the decentralized energy resource may comprise: obtaining an energy pattern which is generated from the decentralized energy resource; obtaining energy threshold consumed by the customer; selecting decentralized energy resources having the value which are the energy threshold or higher consumed by the customer from the decentralized energy resources; and arranging energy outputs being outputted from the selected decentralized energy resources in energy arrangement space and then controlling the energy outputs not to result in energy output having energy less than the energy threshold consumed by the customer.

In still another embodiment, the step of controlling the energy output, when the energy output having energy less than the energy threshold consumed by the customer is resulted in, may comprise controlling the energy outputs not to result in energy output having energy less than the energy threshold consumed by the customer by time shifting at least one energy output selected from the energy outputs.

In still another embodiment, the step of obtaining a customer load profile may comprise obtaining a decentralized energy resource load profile periodically from the decentralized energy resource which supplies energy to the customer In still another embodiment, the customer load profile may comprise energy consumption information from the customer, wherein the decentralized energy resource load profile may comprise energy information which is generated from the decentralized energy resource.

In still another embodiment, the method may further comprise providing energy to the customer by the decentralized energy resource which receives the request, wherein when the decentralized energy resource is more than one, the plurality of the decentralized energy resources may be driven in parallel to supply energy to the customer.

In still another embodiment, the method may further comprise storing a history for the energy provided from the decentralized energy resources to the customer.

The system and method for decentralized energy resource based active virtual power energy management according to an embodiment of the present invention is able to supply stabilized energy actively by clustering decentralized energy resource virtually based on an energy load profile of a customer in decentralized energy resource environment to prepare for energy shortage or in case of emergency.

BRIEF DESCRIPTION OF THE DRAWINGS

FIG. 6 is a flowchart illustrating a method for decentralized energy resource based active virtual power energy management according to an embodiment of the present invention.

DESCRIPTION OF THE EXEMPLARY EMBODIMENTS

The above and other objects, features and advantages of the present invention will become more apparent to those of ordinary skill in the art by describing in detail exemplary embodiments thereof with reference to the accompanying drawings. Throughout the description of the present invention, when describing a certain technology is determined to evade the point of the present invention, the pertinent detailed description will be omitted. The terms used hereinafter are defined by considering their functions in the present invention and can be changed according to the intention, convention, etc. of the user or operator. While the present invention will be described with reference to particular embodiments, it is to be appreciated that various changes and modifications may be made by those skilled in the art without departing from the spirit and scope of the present invention, as defined by the appended claims and their equivalents. Therefore, the definitions of these terms shall be made based on the overall description of this specification.

Hereinafter, exemplary embodiments of the present invention will be described in detail with reference to the accompanying drawings.

Figure 1:
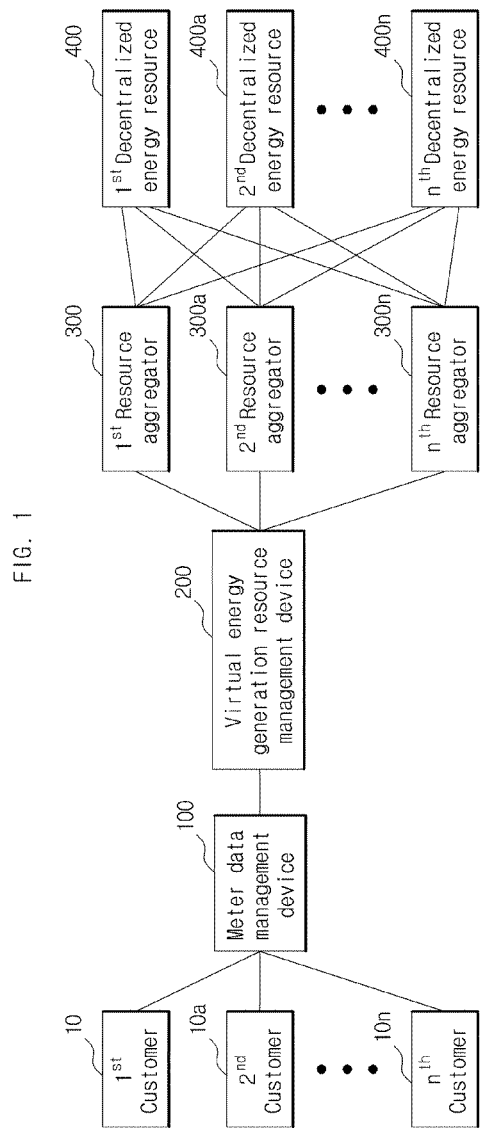
FIG. 1 is a block view illustrating a system for decentralized energy resource based active virtual power energy management according to an embodiment of the present invention.

FIG. 1 is a block view illustrating a system for decentralized energy resource based active virtual power energy management according to an embodiment of the present invention.

Referring to FIG. 1, a system for decentralized energy resource based active virtual power energy management according to an embodiment of the present invention may comprise a meter data management device 100, a resource aggregator 300 and a virtual energy generation resource management device 200.

The meter data management device 100 may receive a customer load profile from the customer 10. The customer 10 may be an industrial complex or a regular house which is supplied with power from an electric power company. The customer load profile may include energy using information of the customer. The energy using information may include information about energy which uses voltage of a certain value or higher, information about energy which is used for a certain period of time and information about energy which is intensively used at a specific time. The meter data management device 100 may receive the customer load profile from the customer 10 and provide it to the virtual energy generation resource management device 200.

The resource aggregator 300 may obtain energy generation resource state information and position information of decentralized energy resources 400, 400a, 400n from the decentralized energy resources 400, 400a, 400n. Here, the decentralized energy resources 400, 400a, 400n may be more than one and have different energy production methods. For example, the decentralized energy resources 400, 400a, 400n may include a new renewable energy generator, a combined heat and power generator (CHP), an emergency generator and an energy storage system (ESS).

The energy generation resource state information of the decentralized energy resources 400, 400a, 400n may include information about energy production capacity of the decentralized energy resource 400, energy production time of the decentralized energy resource 400 and the like. The position information of the decentralized energy resources 400, 400a, 400n may be used to select the most efficient decentralized energy resource by estimating distance from customer 10.

The virtual energy generation resource management device 200 may generate a decentralized energy resource load profile using the energy generation resource state information. Furthermore, the virtual energy generation resource management device 200 may provide energy which is requested by the customer 10 on the basis of the customer load profile, the decentralized energy resource load profile and the position information.

The active virtual power energy management system, which is based on the decentralized energy resources 400, 400a, 400n, according to an embodiment of the present invention may provide energy actively by obtaining generation resources which are appropriate to energy demand patterns in correspond to the customer's load profile in case of emergency.

Figure 2:
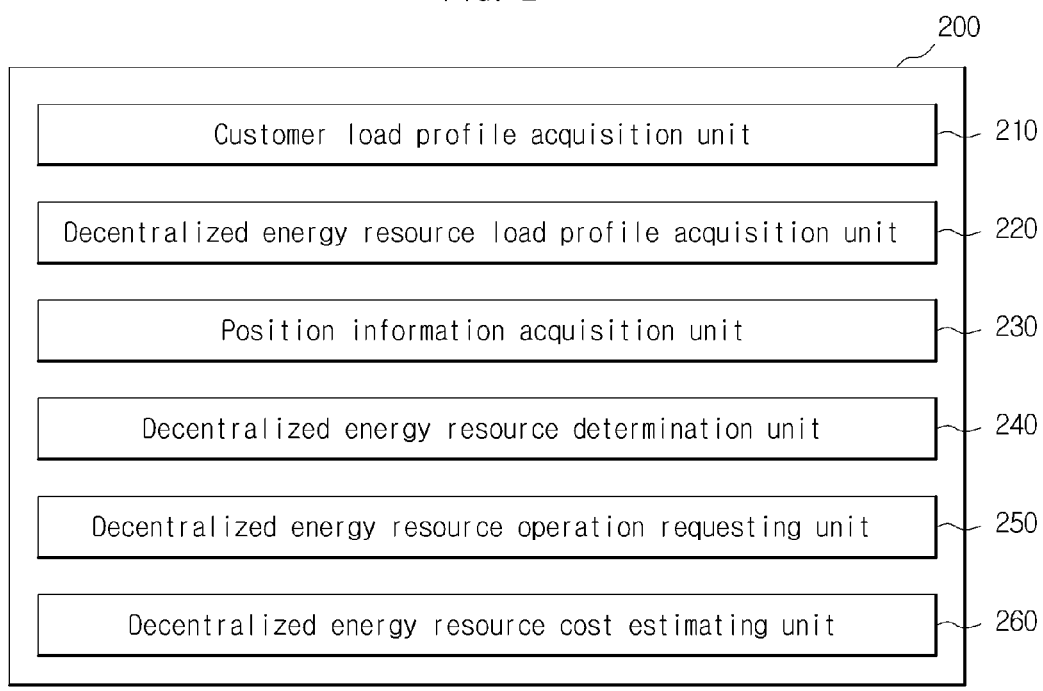
FIG. 2 illustrates internal configuration of a device for decentralized energy resource based active virtual power energy management according to an embodiment of the present invention.

FIG. 2 illustrates internal configuration of a device for decentralized energy resource based active virtual power energy management according to an embodiment of the present invention.

Referring to FIG. 2, the virtual energy generation resource management device 200 according to an embodiment of the present invention may include a customer load profile acquisition unit 210, a decentralized energy resource load profile acquisition unit 220, a position information acquisition unit 230, a decentralized energy resource determination unit 240, and a decentralized energy resource operation requesting unit 250.

The customer load profile acquisition unit 210 may obtain a customer load profile from a customer.

The decentralized energy resource load profile acquisition unit 220 may obtain a decentralized energy resource load profile from the decentralized energy resource 400 which supplies energy to the customer 10. Here, the decentralized energy resource load profile may include information about energy which is generated from the decentralized energy resource.

The position information acquisition unit 230 may obtain position information of the decentralized energy resource.

The decentralized energy resource determination unit 240 may analyze energy using patterns of the customer using the customer load profile and collect candidates of decentralized energy resources which are able to produce energy corresponding to the energy using patterns of the customer. For example, when the energy to supply to the customer requests voltage of a certain value or higher, the decentralized energy resource determination unit 240 may search decentralized energy resources which can produce the voltage of a certain value or higher from the decentralized energy resources 400.

However, when the distance between customer 10 and the decentralized energy resource 400 is a certain value or longer, energy transfer efficiency may be deteriorate. Thus, the decentralized energy resource determination unit 240 may select decentralized energy resources from the candidate group of the decentralized energy resources using the position information.

The decentralized energy resource operation requesting unit 250 may request for energy production to the selected decentralized energy resource 400. The decentralized energy resource 400, which receives the request for energy production from the decentralized energy resource operation requesting unit 250, may produce and provide energy to the customer 10. Here, the decentralized energy resource 400 may calculate amount of the supplied energy and cost corresponding thereto.

The device 200 for decentralized energy resource based active virtual power energy management according to an embodiment of the present invention may further include a decentralized energy resource cost estimating unit 260 estimating cost by comparing production cost of the energy which the decentralized energy resource 400 produces, when the decentralized energy resource determination unit 240 selects decentralized energy resources. Here, the decentralized energy resource determination unit 240 may exclude any decentralized energy resource with a certain value or higher of production cost when the production cost of energy which the decentralized energy resource produces is the certain value or higher. In addition, the decentralized energy resource determination unit 240 may select another decentralized energy resource.

Figure 3:
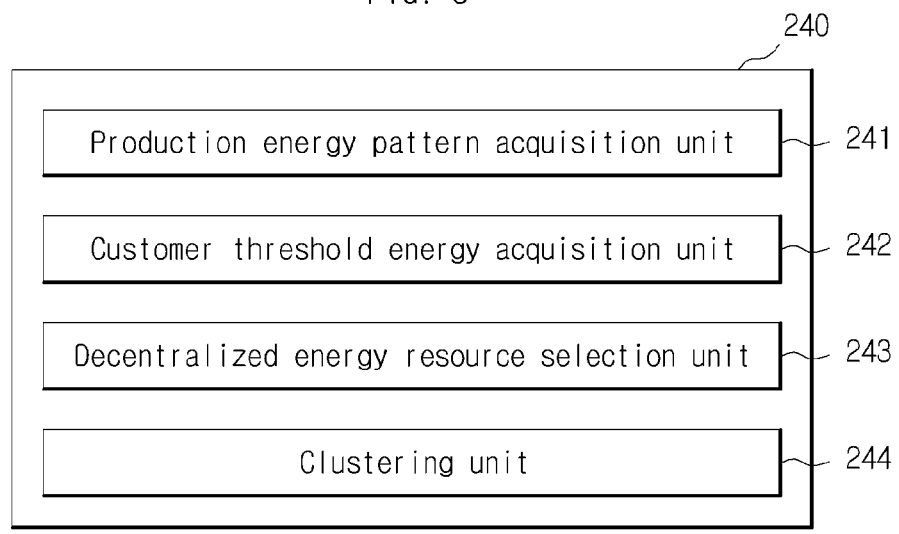
FIG. 3 illustrates internal configuration of a decentralized energy resource determination unit of a device for decentralized energy resource based active virtual power energy management according to an embodiment of the present invention.

FIG. 3 illustrates internal configuration of a decentralized energy resource determination unit of a device for decentralized energy resource based active virtual power energy management according to an embodiment of the present invention.

Referring to FIG. 3, the decentralized energy resource determination unit 240 according to an embodiment of the present invention may include a production energy pattern acquisition unit 241, a customer threshold energy acquisition unit 242, a decentralized energy resource selection unit 243 and a clustering unit 244.

Figure 4:
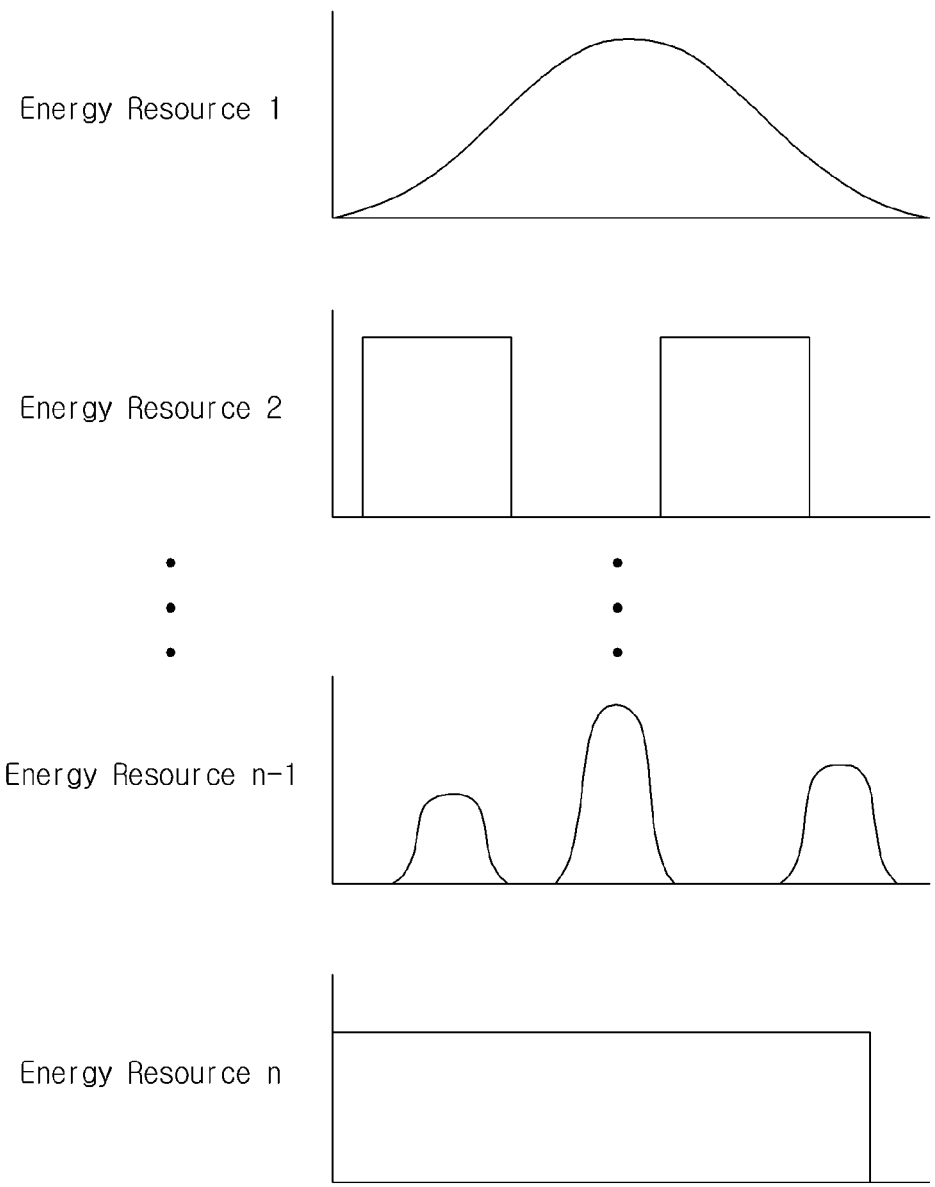
FIG. 4 illustrates energy patterns of decentralized energy resources.

The production energy pattern acquisition unit 241 may obtain a pattern of energy which is produced from decentralized energy resources. FIG. 4 illustrates energy patterns of decentralized energy resources. Referring to FIG. 4, an energy resource 1 may have a normal distribution curve type in which the maximum energy is produced at a specific time, while the amount of energy production decreases significantly with time and becomes zero at a specific time period. An energy resource 2 may produce energy at a certain period of time and the amount produced may be constant for that period.

However, the energy resource 2 has disadvantage of discontinuous energy production. An energy resource n−1 has irregular energy production but the highest peak point. An energy resource n shows the same energy production property with that of direct current but has low the peak point. The production energy pattern acquisition unit 241 may obtain information about the energy pattern generated from the decentralized energy resource 400 and provide it to the decentralized energy resource selection unit 243.

The customer threshold energy acquisition unit 242 may obtain energy threshold consumed by the customer 10. For example, the threshold of voltage which is provided to a regular house should be 220V and that for industrial use be 22500V or higher. The customer threshold energy acquisition unit 242 may obtain the energy threshold to be consumed by the customer 10 to provide to the decentralized energy resource selection unit 243. In an embodiment, the decentralized energy resource load profile acquisition unit 220 may obtain a decentralized energy resource load profile periodically from the decentralized energy resource 400 which supplies energy to the customer 10.

The decentralized energy resource selection unit 243 may select decentralized energy resources which have the threshold or higher of the energy consumed by the customer 10 from the decentralized energy resources 400.

The clustering unit 244 may arrange energy output being outputted from the selected decentralized energy resource 400 in energy arrangement space and control the energy output not to result in the energy output having the energy threshold or lower consumed by the customer 10

Figure 5:
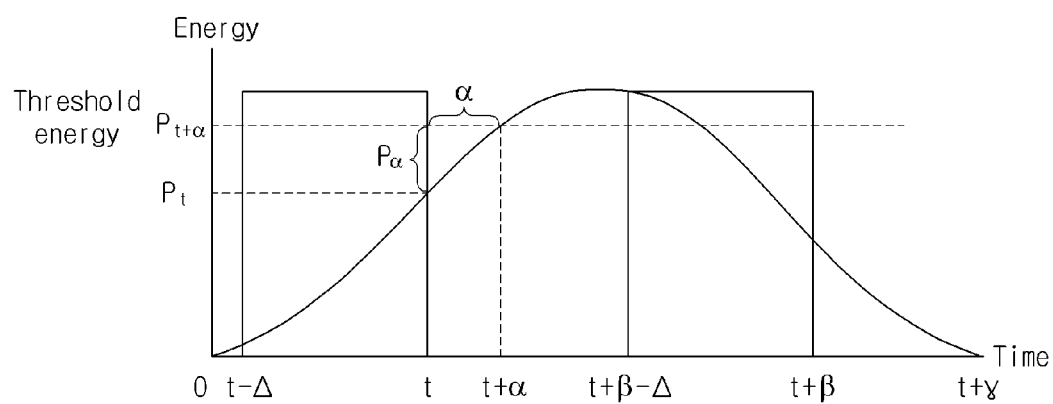
FIG. 5 is a graph illustrating that a clustering unit according to an embodiment of the present invention controls energy output.

FIG. 5 is a graph illustrating that a clustering unit according to an embodiment of the present invention controls energy output. In FIG. 5, X-axis of the graph is a time axis and Y-axis is an energy axis.

Energy should be supplied continuously to maintain threshold power of $P_\alpha$ which is the difference of $P_{t+\alpha}-P_t$ for a time between t and t+α on the basis characteristics of the decentralized energy resource 400. When it is not supplied, it may cause energy supply problem due to poor energy supply to the customer for a period of α time.

When a combination of a generation resource supplying and demanding energy with Gaussian distribution and a generation resource supplying and demanding energy with rectangular distribution is used to control supply and demand of energy, the generation resource with rectangular distribution is time shifted to optimize supply and demand of virtual generation energy or to optimize supply and demand of virtual generation energy by using an energy storage device or another decentralized energy resource 400 to supply Pα energy for the a section.

That is, when the time of the critical energy value to supply to the customer is [t−Δ t+β−Δ], energy may be supplied to the customer by operating the generation resource of the rectangular distribution for the time of [t−Δ t] and the generation resource of the Gaussian distribution for the time of [t+α, t+β−Δ].

However, since insufficient energy for the time of [t, t+α] is the following [Equation 1], at least this much energy can be compensated for the time of [t, t+α]:

$$\alpha(P_{t+\alpha} - P_t) - \int_t^{t+\alpha} f(x)\,dx \quad \text{[Equation 1]}$$

Supply and demand of compensation energy may be optimized to supply corresponding energy at corresponding time by monitoring generation resources available for supplying energy at the corresponding time from the decentralized energy resource 400 and clustering to virtual energy generation resources.

FIG. 6 is a flowchart illustrating a method for decentralized energy resource based active virtual power energy management according to an embodiment of the present invention.

Referring to FIG. 6, in S601, the virtual energy generation resource management device 200 may request a customer load profile to the meter data management device 100.

In S602, the virtual energy generation resource management device 200 may receive a customer load profile from the meter data management device 100.

In S603, the virtual energy generation resource management device 200 may request a decentralized energy resource load profile to the resource aggregator 300.

In S604 and S605, the resource aggregator 300 may receive the decentralized energy resource load profile request from the virtual energy generation resource management device 200 and request energy generation resource state information to a first decentralized energy resource 400 and a second decentralized energy resource 400a. Here, even though only 2 decentralized energy resources are described, a plurality of decentralized energy resources may be present. In addition, one resource aggregator 300 may be connected to a plurality of decentralized energy resources 400, 400a and one decentralized energy resource 400 may be also connected to a plurality of resource aggregator 300.

In S606 and S607, the resource aggregator 300 may receive energy generation resource state information from the first decentralized energy resource 400 and the second decentralized energy resource 400a. Further, the resource aggregator 300 may collect position information of the first decentralized energy resource 400 and the second decentralized energy resource 400a In S608, the resource aggregator 300 may transmit energy generation resource state information and position information of the decentralized energy resource to the virtual energy generation resource management device 200.

In S609, the virtual energy generation resource management device 200 may generate a decentralized energy resource load profile.

In S610, the virtual energy generation resource management device 200 may analyze the decentralized energy resource load profile and the customer load profile.

In S611, the virtual energy generation resource management device 200 may estimate cost based on energy production cost produced from the decentralized energy resources.

In S612, the virtual energy generation resource management device 200 may determine decentralized energy resource based on the decentralized energy resource load profile, the customer load profile, and the energy production cost produced from the decentralized energy resources.

In S613 and S614, operation of the decentralized energy resources 400, 400a may be requested.

In S615 and S616, the decentralized energy resources 400, 400a supply energy to the customer 10 and report operation conditions. Here, when the decentralized energy resource 400 and the decentralized energy resource 400a supply energy to the customer 10, they may supply in the order arranged by the customer.

In another embodiment, the decentralized energy resource 400 and the decentralized energy resource 400a may supply energy at the same time according to energy forms requested by the customer 10. That is, the decentralized energy resource 400 and the decentralized energy resource 400a may be driven in parallel to supply energy to the customer 10.

In addition, the decentralized energy resource 400 and the decentralized energy resource 400a may store a history for the provided energy to the customer 10. The stored energy providing history may be used to determine the operation of the decentralized energy resource 400 and the decentralized energy resource 400a.

The method or algorithm steps described with reference to exemplary embodiments of the present invention can be implemented by using hardware, software executing in processors or its combination. The software module can be installed in a RAM memory, a flash memory, a ROM memory, an EPROM memory, an EEPROM memory, a resistor, a hard disk, a detachable disk, a CD-ROM, or any type of storage medium well-known in the art. An exemplary storage medium can be combined with the processor, so that the processor can read information from the storage medium and write information to the storage medium. Alternatively, the storage medium can be integrated to the processor. The processor and the storage medium can be installed in ASIC. The ASIC can be located in a user's terminal. The processor and the storage medium can be also installed as separate components in a user's terminal.

All processors described above can be implemented in software code modules executed by more than one general purpose or special purpose computers or processors and can be fully automated through the software code modules. The code modules can be stored in a computer readable medium or another computer storage device or an integrated device of storage devices. All or a part of the methods can be implemented in specialized computer hardware.

All methods and tasks described herein can be executed by a computer system and be fully automated. The computer system can include multicomputer or computing devices (e.g., servers, workstations, storage arrays and the like) communicating through network and interacting one another to perform the described functions. Each computing device usually includes program languages stored in a memory or another non-transitory computer readable storage medium or processors (or multi-processors or circuits or integrated form of circuits such as module) executing modules. All or a part of functions described herein can be implemented to application-specific circuits (e.g., ASICs or FPGAs) of the computer system and also implemented to program languages. When the computer system includes several computing devices, the devices can be arranged at the same place even though it is not necessary. The methods and tasks' results described herein can be stored permanently in different forms by physical storage devices such as solid state memory chips and/or magnetic disks.

The exemplary embodiments of the present invention described hereinabove are only an example of the present invention and may be variously modified and altered by those skilled in the art to which the present invention pertains without departing from essential features of the present invention.

What is claimed is:

1. A system for decentralized energy resource based active virtual power energy management comprising:
   one or more processors that process computer executable program code embodied in computer readable storage media, the computer executable program code comprising:
   meter data management device program code that receives a customer load profile from a customer;
   resource aggregator program code that obtains energy generation resource state information and position information of a decentralized energy resource from at least one decentralized energy resource; and
   virtual energy generation resource management device program code that generates a decentralized energy resource load profile using the energy generation resource state information and that provides energy required to the customer based on the customer load profile, the decentralized energy resource load profile and the position information,
   wherein the virtual energy generation resource management device program code comprises clustering program code that arranges energy outputs being outputted from selected decentralized energy resources and then controls the energy outputs such that when a combination of decentralized energy resources is used to control supplying energy, at least one of the decentralized energy resources is time shifted to optimize the supplying of energy,
   wherein the virtual energy generation resource management device program code further comprises:
   program code that obtains an energy pattern which is generated from the decentralized energy resource;
   program code that obtains energy threshold consumed by the customer;
   program code that selects decentralized energy resources having the value which are the energy threshold or higher consumed by the customer from the decentralized energy resources; and
   program code that arranges energy outputs being outputted from the selected decentralized energy resources in energy arrangement space and then controlling the energy outputs not to result in energy output having energy less than the energy threshold consumed by the customer, and
   wherein the program code that controls the energy output, when the energy output having energy less than the energy threshold consumed by the customer is resulted in, comprises program code that controls the energy outputs not to result in energy output having energy less than the energy threshold consumed by the customer by time shifting at least one energy output selected from the energy outputs.

2. A device for decentralized energy resource based active virtual power energy management comprising:
   one or more processors that process computer executable program code embodied in computer readable storage media, the computer executable program code comprising:
   customer load profile acquisition program code that obtains a customer load profile from a customer;
   decentralized energy resource load profile acquisition program code that obtains a decentralized energy resource load profile from decentralized energy resources which provide energy to the customer;
   position information acquisition program code that obtains position information of the decentralized energy resources;
   decentralized energy resource determination program code that analyzes an energy using pattern of the customer using the customer load profile, that collects a candidate group of the decentralized energy resources which generate energy corresponding to the energy using pattern of the customer, and that selects a decentralized energy resource from the candidate group of the decentralized energy resources using the position information; and
   decentralized energy resource operation requesting program code that requests energy production to the selected decentralized energy resource,
   wherein the decentralized energy resource determination program code comprises clustering program code that arranges energy outputs being outputted from selected decentralized energy resources and then controls the energy outputs such that when a combination of decentralized energy resources is used to control supplying energy, at least one of the decentralized energy resources is time shifted to optimize the supplying of energy wherein the decentralized enemy resource determination
program code further comprises:
program code that obtains an energy pattern which is
generated from the decentralized energy resource;
program code that obtains energy threshold consumed by
the customer;
program code that selects decentralized energy resources
having the value which are the energy threshold or
higher consumed by the customer from the decentralized energy resources; and
program code that arranges energy outputs being outputted from the selected decentralized energy resources in
energy arrangement space and then controlling the
energy outputs not to result in energy output having
energy less than the energy threshold consumed by the
customer, and
wherein the program code that controls the energy output,
when the energy output having energy less than the
energy threshold consumed by the customer is resulted
in, comprises program code that controls the energy
outputs not to result in energy output having energy less
than the energy threshold consumed by the customer by
time shifting at least one energy output selected from
the energy outputs.

3. The device of claim 2,
further comprising decentralized energy resource cost
estimating program code that estimates cost by comparing costs of energy productions which the decentralized energy resources generate when the decentralized energy resource determination program code
selects the decentralized energy resource,
wherein the decentralized energy resource determination
program code, when the production cost is a predetermined value or higher, excludes a decentralized energy
resource of which the production cost is a predetermined value or higher.

4. The device of claim 2, wherein the decentralized energy
resource determination program code further comprises:
production energy pattern acquisition program code that
obtains an energy pattern which is generated from the
decentralized energy resource;
customer threshold energy acquisition program code that
obtains energy threshold consumed by the customer;
and
decentralized energy resource selection program code that
selects a decentralized energy resource having the
value which is the energy threshold or higher consumed
by the customer from the decentralized energy
resources; and
wherein the clustering program code controls the energy
outputs so as not to result in energy output having
energy less than the energy threshold consumed by the
customer.

5. The device of claim 2, wherein the clustering program
code, when the energy output having energy less than the
energy threshold consumed by the customer is resulted in,
controls the energy outputs not to result in energy output
having energy less than the energy threshold consumed by
the customer by time shifting at least one energy output
selected from the energy outputs.

6. The device of claim 2, wherein the decentralized energy
resource load profile acquisition program code obtains a
decentralized energy resource load profile periodically from
the decentralized energy resource which supplies energy to
the customer.

7. The device of claim 2,
wherein the customer load profile comprises energy consumption information from the customer,
wherein the decentralized energy resource load profile
comprises energy information which is generated from
the decentralized energy resource.

8. A method for decentralized energy resource based
active virtual power energy management comprising:
processing by one or more processors that process computer executable program code embodied in computer
readable storage media, the computer executable program code comprising:
program code that obtains a customer load profile from a
customer;
program code that obtains a decentralized energy resource
load profile from a decentralized energy resource which
provides energy to the customer;
program code that obtains position information of the
decentralized energy resource;
program code that analyzes an energy using pattern of the
customer and collecting a candidate group of the decentralized energy resources which generate energy corresponding to the energy using pattern of the customer;
program code that selects the decentralized energy
resources from the candidate group of the decentralized
energy resources using the position information; and
program code that requests energy production to the
selected decentralized energy resource,
wherein the program code that selects decentralized
energy resources comprises clustering program code
that arranges energy outputs being outputted from
selected decentralized energy resources and then controls the energy outputs such that when a combination
of decentralized energy resources is used to control
supplying energy, at least one of the decentralized
energy resources is time shifted to optimize the supplying of energy,
wherein the program code that selects the decentralized
energy resource comprises:
program code that obtains an energy pattern which is
generated from the decentralized energy resource;
program code that obtains energy threshold consumed by
the customer;
program code that selects decentralized energy resources
having the value which are the energy threshold or
higher consumed by the customer from the decentralized energy resources; and
program code that arranges energy outputs being outputted from the selected decentralized energy resources in
energy arrangement space and then controlling the
energy outputs not to result in energy output having
energy less than the energy threshold consumed by the
customer, and
wherein the program code that controls the energy output,
when the energy output having energy less than the
energy threshold consumed by the customer is resulted
in, comprises program code that controls the energy
outputs not to result in energy output having energy less
than the energy threshold consumed by the customer by
time shifting at least one energy output selected from
the energy outputs.

9. The method of claim 8,
further comprising program code that estimates cost by
comparing costs of energy productions which the
decentralized energy resources generate, wherein when the decentralized energy resource is selected, a decentralized energy resource of which the production cost is a predetermined value or higher is excluded.

10. The method of claim 8, wherein program code that obtains a customer load profile comprises program code that obtains a decentralized energy resource load profile periodically from the decentralized energy resource which supplies energy to the customer.

11. The method of claim 8, wherein the customer load profile comprises energy consumption information from the customer, wherein the decentralized energy resource load profile comprises energy information which is generated from the decentralized energy resource.

12. The method of claim 8,
further comprising program code that provides energy to the customer by the decentralized energy resource which receives the request,
wherein when the decentralized energy resource is more than one, the plurality of the decentralized energy resources are driven in parallel to supply energy to the customer.

13. The method of claim 12, further comprising program code that stores a history for the energy provided from the decentralized energy resources to the customer.

* * * * *